Figure 12:
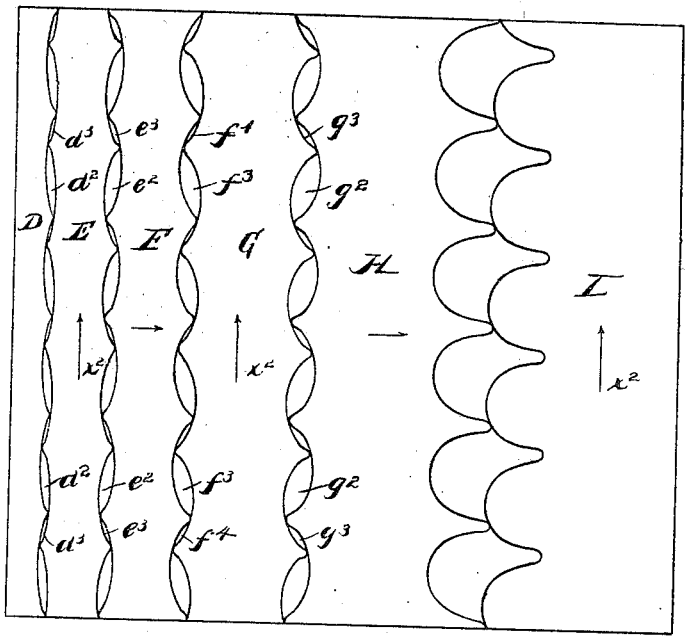

No. 676,897. Patented June 25, 1901.
F. W. JAEGER.
COMPOUND MOTOR.
(Application filed Jan. 22, 1900.)
(No Model.) 4 Sheets—Sheet 1.
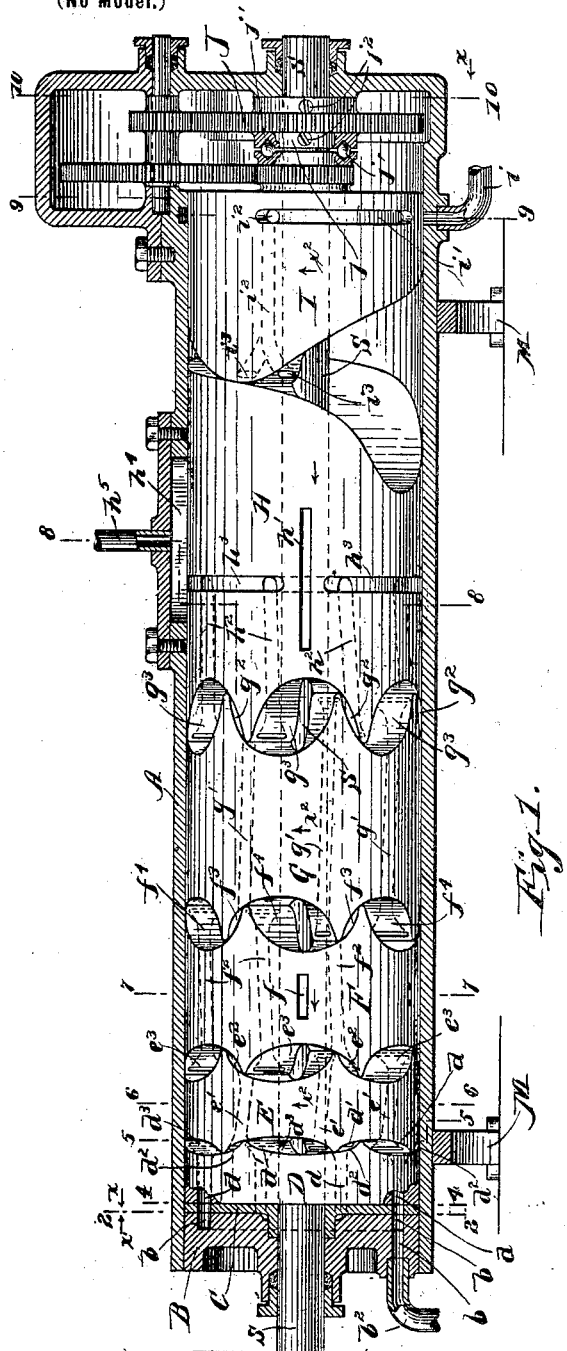
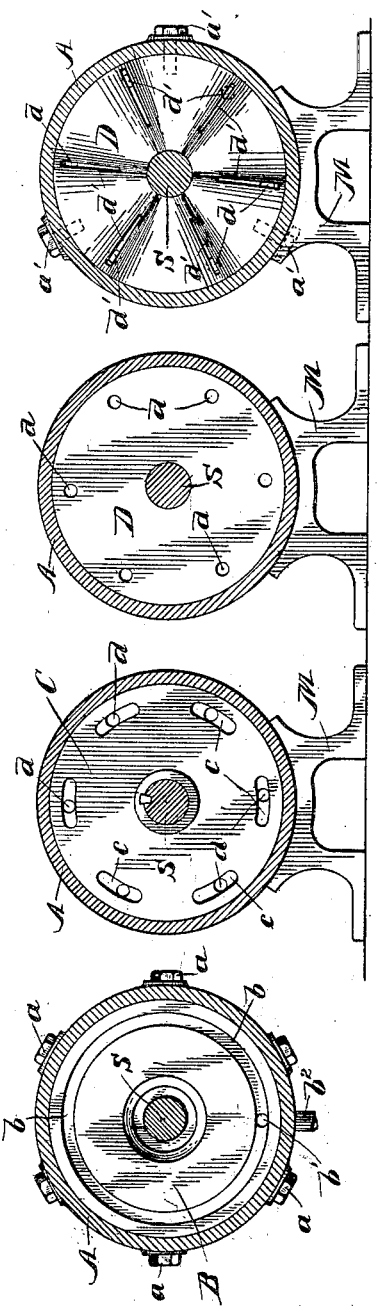
WITNESSES:
Geo. W. Eisenbraun.
E. P. Hendrickson.
INVENTOR:
Frederick W. Jaeger
BY
Asher du Faur Jr.
ATTORNEY
THE NORRIS PETERS CO., PHOTO-LITHO., WASHINGTON, D. C.

No. 676,897. Patented June 25, 1901.
F. W. JAEGER.
COMPOUND MOTOR.
(Application filed Jan. 22, 1900.)
(No Model.) 4 Sheets—Sheet 2.
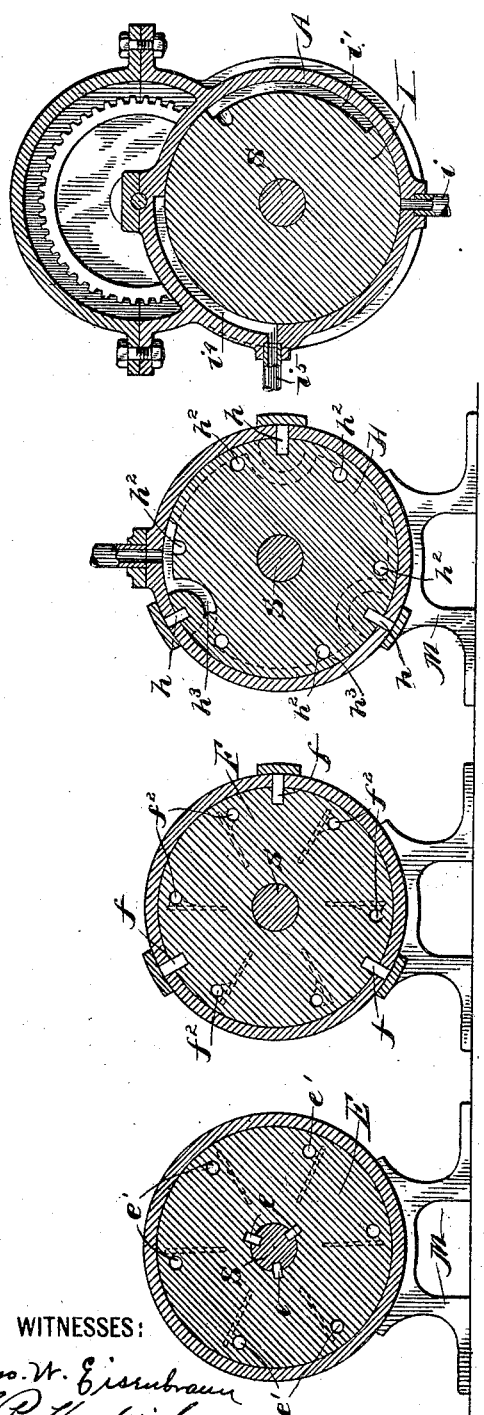
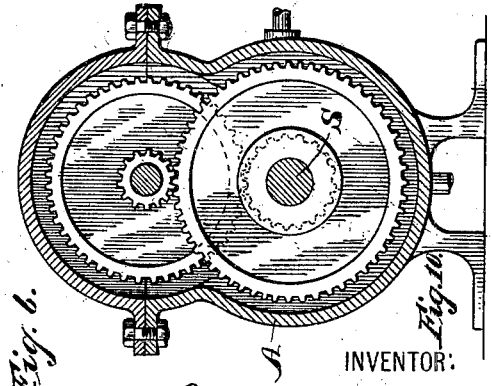
WITNESSES:
INVENTOR:
Frederick W. Jaeger,
BY
ATTORNEY.

No. 676,897. Patented June 25, 1901.
F. W. JAEGER.
COMPOUND MOTOR.
(Application filed Jan. 22, 1900.)
(No Model.) 4 Sheets—Sheet 3.

WITNESSES:
Geo. W. Eisenbraun
E. P. Hendrickson

INVENTOR:
Frederick W. Jaeger
BY
A. Faber du Faur
ATTORNEY

No. 676,897. Patented June 25, 1901.
F. W. JAEGER.
COMPOUND MOTOR.
(Application filed Jan. 22, 1900.)
(No Model.) 4 Sheets—Sheet 4.

WITNESSES:
Geo. W. Eisenbaum
E. P. Hendrickson

INVENTOR:
Frederick W. Jaeger
BY
Asher du Faur
ATTORNEY

UNITED STATES PATENT OFFICE.

FREDERICK W. JAEGER, OF MAYWOOD, NEW JERSEY.

COMPOUND MOTOR.

SPECIFICATION forming part of Letters Patent No. 676,897, dated June 25, 1901.

Application filed January 22, 1900. Serial No. 2,270. (No model.)

*To all whom it may concern:*

Be it known that I, FREDERICK W. JAEGER, a citizen of the United States of America, residing at Maywood, in the county of Bergen and State of New Jersey, have invented certain new and useful Improvements in Compound Motors, of which the following is a specification.

My invention relates to a form of engine, pump, or a similar apparatus consisting of a piston or pistons and cylinder-heads mounted within a casing and having cam-shaped opposing surfaces rotatably riding over each other and forming chambers or pockets for the admission of an expansible fluid, and is in the nature of an improvement upon a previous application now on file in the Patent Office, bearing Serial No. 741,537, and dated December 26, 1899.
The object of my invention is to provide an engine in which the expansible fluid may be used successively in several series of pockets or chambers of different volumes and finally exhausted from the last series of chambers or pockets. The action of the expansible fluid in the chambers has a tendency to suspend or balance the piston or pistons, thereby reducing the friction of the contacting noses and surfaces and assuring an easy reciprocating motion to the reciprocating or vibrating parts. In most forms of my device the wear upon all the abutting noses and contacting cam-surfaces is taken up by means of the adjustment of one of the cams.
The nature of my invention will be best understood when described in connection with the accompanying drawings, in which—

Figure 1 is a sectional view of a complete engine embodying my improved principle.
Fig. 2 is a section taken on the line 2 2, Fig. 1, looking in the direction indicated by arrow $x$ and shows the inside end of the cylinder-head. Fig. 3 is a section on the same line, but looking in the direction indicated by the arrow $x'$ and shows the valve-disk with its perforations. Fig. 4 is a section on the line 4 4, Fig. 1, and shows the end of the stationary head. Fig. 5 is a section on the line 5 5, Fig. 1, looking in the direction of the arrow $x$ and shows the cam-shaped surfaces upon the stationary head. Fig. 6 is a section on the line 6 6, Fig. 1, looking in the direction of arrow $x'$ and shows the method of attaching the piston to the shaft. Fig. 7 is a section on the line 7 7, Fig. 1, and shows the method of attaching the reciprocating head to the shell or casing. Fig. 8 is a section on the line 8 8, Fig. 1, and shows the exhaust-channels upon the reciprocating head. Fig. 9 is a section on the line 9 9, Fig. 1, looking in the direction of arrow $x'$ and shows the steam-channels for admitting steam in the cam-pocket. Fig. 10 is a section on the line 10 10, Fig. 1, looking in the direction of arrow $x$ and shows the gear-wheels for operating the cam. Fig. 11 is a diagram showing half of the developed form of the cam-shaped abutting surfaces. Figs. 12 to 19, inclusive, are diagrams showing the developed form of various modified forms of noses and contacting surfaces.

Similar letters of reference designate corresponding parts throughout the several views of the drawings.

Referring to the drawings, the letter A designates the shell or outer casing; B, the cylinder-head, securely fastened in the end of the shell or casing A by means of screws $a$, and is formed with a chanel $b$ upon its inner surface, and is connected, by means of a port $b'$, to the inlet-pipe $b^2$.

C designates a rotating valve-disk mounted upon and rotating with a shaft S, and is provided with slots $c$ in line with the channel $b$ upon the cylinder-head B.

D is a stationary cylinder-head fastened in the casing A by means of the screws $a'$, and is formed with a cam-shaped surface having several noses.

E designates a rotating and reciprocating piston mounted upon the shaft S and formed with cam-shaped surfaces having several noses, the surfaces on one end of the piston being similar to and engaging with the cam-surfaces on the adjacent stationary head D. The piston E is fastened to the shaft S by means of the feathers $e$, which engage in a slot on the piston and are adapted to allow the piston to reciprocate upon the shaft.

F designates a reciprocating head having cam-shaped surfaces with several noses, the cam-shaped surface on one end being adapted to engage with a similar cam-shaped surface on the adjacent piston and formed so as to make chambers or pockets of a greater capacity or volume than the pockets formed between the stationary head D and the piston E, and is held within the casing by the feathers $f$, which engage in slots $f'$ and are adapted to allow the head to reciprocate within the casing.

G designates a second piston mounted and reciprocating upon the shaft S and having cam-shaped surfaces, the cam-shaped surface on one end being similar in shape and size to and engaging with the cam-shaped surface on the adjacent reciprocating head F and adapted to form pockets of a greater capacity or volume than the pockets formed between the piston E and the reciprocating head F.

H designates a second reciprocating head held in the casing by the feathers $h$, engaging in the slots $h'$ and adapted to allow the head to reciprocate in the casing, and having one end formed with a cam-shaped surface with several noses similar to and engaging with a cam-shaped surface formed upon the adjacent piston G and adapted to form chambers or pockets of a greater capacity or volume than the pockets formed between the head F and the piston G.

I is a rotating cam mounted upon but not fastened to the shaft S, and is formed with a cam-surface engaging a reverse cam-surface upon the head H and is adapted, by means of suitable gearing, to make one complete revolution every time the contacting noses travel the distance between two adjacent noses, thereby taking up the reciprocating motion of the reciprocating parts.

To reduce the friction of the cam against the hub $j$ of the gear-wheel J, I interpose the bearing-balls $j'$, and to take up any wear on the contacting noses and cam-surfaces I provide the hub $j$ with two set-screws $j^2$, which will allow for the adjustment of the parts.

The stationary head D is formed with channels $d$, which communicate with the slot-openings $c$ in the rotating valve-disk C and terminate in the ports $d'$ on one side of the noses of the cam-surface and are adapted to lead expansible fluid into the chambers or pockets $d^2$. The rotating piston E is provided with channels or passages $e'$, which lead from the pockets or chambers $d^3$ to the chambers $e^2$. The channels or passages $f^2$, formed in the reciprocating head F, lead from the pockets $e^3$ to the pockets $f^3$, and the channels $g'$, formed in the rotating piston G, lead from the pockets $f^4$ to the pockets $g^2$. The exhaust-channels $h^2$ lead from the pockets $g^3$ to the channel $h^3$, the upper end of which communicates with a chamber $h^4$, which is provided with an outlet-pipe $h^5$.

K designates a fly-wheel mounted upon the end of the shaft S, and M M are supports for the shell or casing and mechanism contained therein.

To illustrate the operation of my device, I will assume that steam is used. The steam is admitted to the pockets $d'$ through the inlet-pipe $b^2$, channel $b$, opening $c$ in the rotating disk valve, and port $d$ until the noses of the cam-surfaces have traveled half the distance between the noses, whereupon the rotating disk closes the port $d$, thereby shutting off the steam and leaving the steam in the pockets $d^2$ to expand and drive the rotating piston E until the contacting noses have passed each other. The openings $c$ in the disk C again come in line with the ports $d$ and allow steam to again enter the pockets $d^2$, and the revolution of the piston E causes the steam which is now in pockets $d^3$ to pass out through the channel $e'$ into the pockets $e^2$, whose volume or capacity is greater than that of pockets $d^2$ and $d^3$, and there it further expands and aids to drive the piston. As the piston revolves, the steam is then led from the pockets $e^3$, through the channels $f^2$, to the pockets $f^3$, from the pockets $f^4$ to the pockets $g^2$, and from the pockets $g^2$ it is led to the channel $h^3$, through the passage $h^2$, and into the chamber $h^4$, where it exhausts through the outlet-pipe $h^5$.

The chambers or pockets $d^2$, $e^2$, $f^3$, and $g^2$ are all expansive chambers or chambers that always contain expanding steam and tend to drive the pistons E and G in a rotary direction, as indicated by the arrows $x^2$.

The cam I is adapted to take up the reciprocating motion of the reciprocating parts and makes one complete revolution for every live-steam pocket formation. To aid the cam I in its operation, I admit steam in the pocket formed between the cam and the adjacent reciprocating head H by means of the inlet $i$, rotating valve-channel $i'$, and the channel $i^2$, terminating in the ports $i^3$. I admit steam into this pocket during one-quarter of the revolution of the cam and then allow it to expand to the full capacity of the pocket and then exhaust through the channels $e^2$ and $i'$ into the exhausting-channel $i^4$ and out through the outlet $i^5$.

In the drawings I have shown an engine having a revolving shaft; but the shell or casing may be made to revolve by holding the shaft stationary, and by slight modification the reciprocating motion may be employed as a means for condensing fluids, &c., or for any purpose where reciprocating motion is necessary.

I do not wish to be understood as limiting myself to the particular form of construction shown in Fig. 1, as any modified form of my device embodying my principle and enabling me to use the expansible fluid in successive expansion-chambers of increasing capacities may be employed.

In Fig. 11 I show half of the developed surface of the several cam-shaped parts of Fig. 1 and have designated the corresponding parts by similar letters.

In Fig. 12 I show a developed surface of an engine having six-nosed cam-shaped surfaces and a corresponding operating-cam to take up the reciprocating motion of the reciprocating parts and doing away with the gear-wheels shown in Fig. 1.

Figure 13:
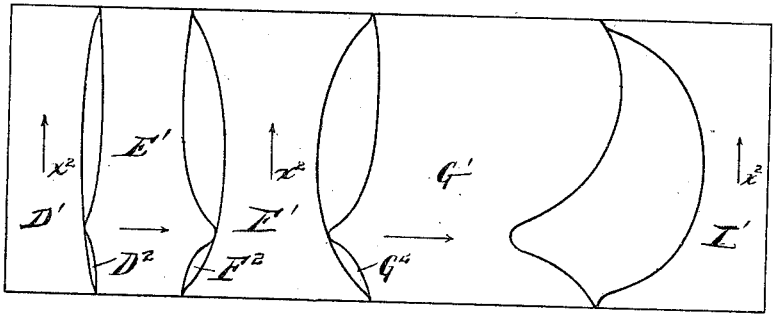

In Fig. 13 I show a piston D', having one cam-shaped contacting surface and two reciprocating heads E' and G' operating with the piston F' and cam I', and all the cam-shaped surfaces having but one nose and adapted to form pockets $D^2$, $F^2$, and $G^2$ of successively-increasing capacity.

Figure 14:
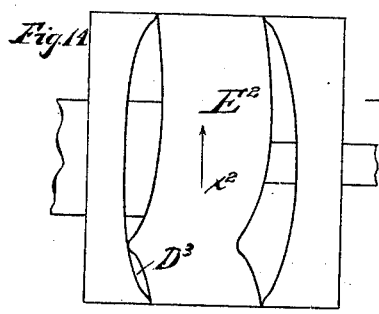

In Fig. 14 I increase the diameter of the shaft S' to produce the high-pressure chamber or pocket $D^3$ and show a reciprocating piston $E^2$ without reciprocating heads.

Figure 15:
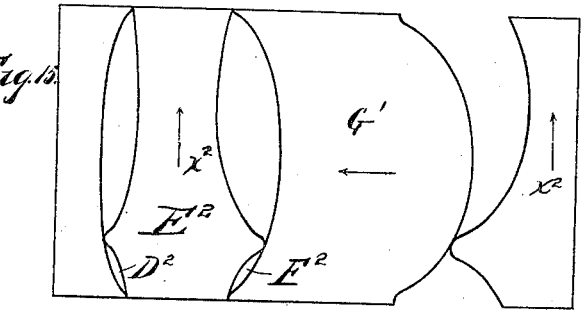

Fig. 15 shows a method in which I use but one piston $E^2$ and reciprocating head G' and form two pockets $D^2$ and $F^2$ of different capacity.

Figure 16:
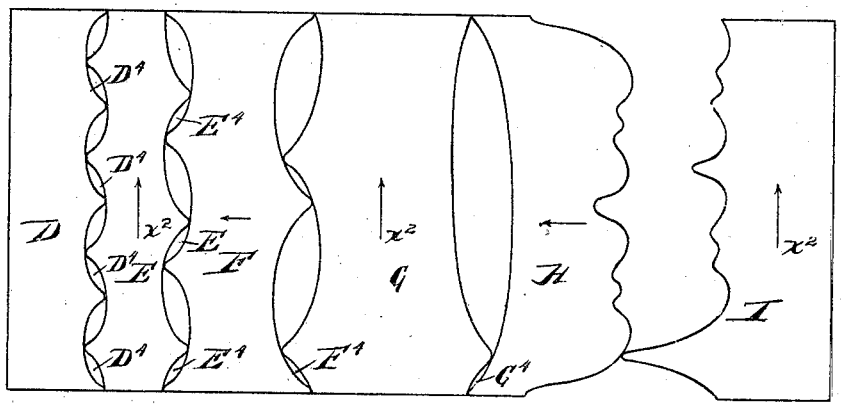

Fig. 16 shows a method of using the expansive element of the expanding fluid in the ratio of four, three, two, one, the pockets taking the steam at high pressure. From these pockets the fluid passes into the pockets $E^4$, whose combined volume or capacity is greater than the combined volume or capacity of the pockets $D^4$. From these it passes into the pockets $F^4$, whose total capacity is still greater, and, lastly, the fluid passes into the pocket $G^4$, whose capacity is greatest.

Figure 17:
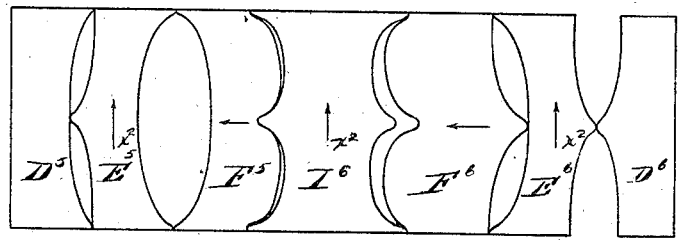

In Fig. 17 I show cam-surfaces having one nose and show two sets of pistons and reciprocating heads $E^5$ and $F^5$ and $E^6$ and $F^6$, two stationary heads $D^5$ and $D^6$, and one rotating cam $I^6$, mounted between the two sets of pistons and reciprocating heads. The noses of the cam-surfaces on the pistons and the heads are so arranged that while one nose of the piston is riding up the nose of the adjacent head the nose on the other end of the piston is riding down the nose on the adjacent head, thereby reducing the reciprocating motion of the reciprocating heads $F^5$ and $F^6$ to a minimum.

Figure 18:
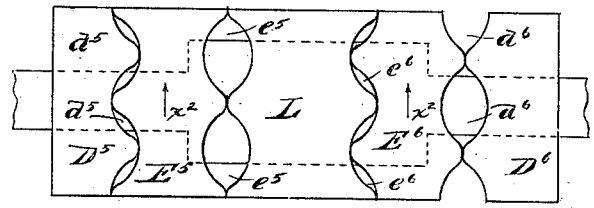

Fig. 18 shows a simple form of cam-surfaces arranged in two sets on each side of a stationary head L. The cam-surfaces are so constructed as to take up the reciprocating motion of the pistons $E^5$ and $E^6$, the heads L, $D^5$, and $D^6$ remaining stationary. In this construction I change the diameter of the shaft to form the chambers of different capacity, as shown in Fig. 14. The expansible fluid first enters the chambers $e^5$ and $e^6$ and then the chambers $d^5$ and $d^6$.

Figure 19:
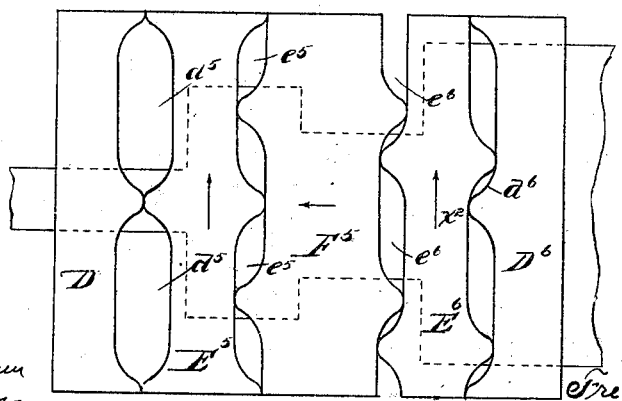

Fig. 19 shows a method of duplicating the series of pockets on each side of a reciprocating head $F^5$ and formed by the pistons $E^5$ and $E^6$ and cylinder-heads D and $D^6$. The arrangement of the noses and cam-surfaces is such that the reciprocating motion of the head $F^5$ due to the rotation of the piston E is taken up or equalized by reciprocation due to the rotation of the piston $E^6$, thereby doing away with a rotating cam. In this form I vary the size of the shaft to produce chambers of varying capacity. The expansible fluid first enters the pockets $d^6$, then by suitable passages and channels it passes from the pockets $d^6$ to the pockets $e^5$, from whence it goes to the pockets $e^6$, and lastly to the pockets $d^5$.

It is obvious that any of the modifications may be embodied, individually or collectively, in my invention without departing from the spirit of the same, and in the previous application (the serial number of which has been given) I show still other modifications which may very readily be applied to the form of device described herein.

What I claim as new is—

1. In an apparatus as herein described, the combination with a casing, of pistons and cylinder-heads, having cam-shaped abutting surfaces and noses adapted to ride over each other and form successive pockets, the capacity of each successive pocket or chamber being greater than its preceding pocket or chamber, substantially as described.

2. In an apparatus as herein described, the combination with a casing, of a piston or pistons and cylinder head or heads provided with cam-shaped abutting surfaces and noses adapted to rotatably ride over each other and form successive series of pockets or chambers for containing live and exhaust fluid, the capacity of the pockets or chambers of each successive series being greater than its preceding series of pockets or chambers, substantially as described.

3. In an apparatus as herein described, the combination with a casing, of a piston or pistons, and a cylinder-head, provided with adjacent cam-shaped abutting surfaces and noses adapted to contact and ride over each other and form successive series of pockets or chambers for containing live and exhaust fluid, the live chambers gradually increasing in volume to permit expansive working of live fluid, while the exhaust-chambers decrease in volume for the purpose of expelling exhaust fluid, and the volume of each successive series of pockets or chambers being greater than its preceding series and adapted to admit the expansible fluid successively into the successive live chambers, and means for controlling the introduction of live fluid and the expulsion of exhaust fluid, substantially as described.

4. In an apparatus as herein described, the combination with a casing, of a piston or pistons, a cylinder head or heads, a reciprocating head or heads provided with cam-shaped contacting or abutting surfaces and noses adapted to ride over each other and form successive pockets or series of pockets successively increasing in volume or capacity and adapted to contain live and exhaust fluid, and a cam rotating with the piston or pistons and adapted to keep the abutting surfaces and noses in contact, substantially as described.

5. In an apparatus as herein described, the combination with a casing, of a piston or pistons, a cylinder head or heads, a reciprocating head or heads, all provided with cam-shaped contacting or abutting surfaces and noses adapted to ride over each other and form successive pockets or series of pockets successively increasing in capacity or volume and adapted to contain live and exhaust fluid, a cam adapted to keep the noses and abutting surfaces in contact, and suitable gear-wheels connected to the shaft and said cam, and adapted to give the cam a complete revolution for every reciprocation of the reciprocating parts, substantially as described.

6. In an apparatus as herein described, the combination with a casing, of a piston or pistons, a cylinder and a reciprocating head or heads having contacting cam-shaped surfaces and noses adapted to ride over each other and to form successive pockets or series of pockets for containing live and exhaust fluid, a cam adapted to keep the abutting surfaces and noses in contact, and means for adjusting said cam to take up the wear upon the said cam-surfaces and abutting noses, substantially as described.

7. In an apparatus as herein described, the combination with a casing, of a piston or pistons, a cylinder and a reciprocating head or heads having contacting cam-shaped surfaces and noses adapted to ride over each other and to form successive pockets or series of pockets for containing live and exhaust fluid, a cam adapted to keep the abutting surfaces and noses in contact, a valve adapted to admit and exhaust fluid into and out of the pocket formed between the cam and the adjacent reciprocating head, thereby facilitating the operation of said cam, substantially as described.

8. In an apparatus as herein described, the combination with a casing, of a piston or pistons, a cylinder head or heads, and a reciprocating head or heads provided with cam-shaped abutting surfaces and noses adapted to contact and rotatably ride over each other to form pockets of varying capacity or volume for containing live and exhaust fluid, substantially as described.

9. In an apparatus as herein described, the combination with a casing, of a reciprocating piston or pistons, and stationary heads provided with adjacent cam-shaped contacting surfaces and noses, and a shaft of varying diameter concentric with said piston and head or pistons and heads and adapted to form pockets of varying capacity or volume, substantially as described.

10. In an apparatus as herein described, the combination with a casing, of a piston or pistons, a cylinder and a reciprocating head or heads formed with contacting cam-shaped surfaces and noses and adapted to rotatably ride over each other and form pockets or successive series of pockets for containing live and exhaust fluid, and a shaft of varying diameter concentric with said pistons and heads and adapted to form chambers or pockets of varying volume, substantially as described.

11. In an apparatus as herein described consisting of a cam-shaped piston and heads within a casing adapted to rotatably ride over one another forming pockets of different volumes between the cam-surfaces, with suitable means for admitting fluid or gases, and means for exhausting the same, the action of the fluid or gases within said pockets being to suspend or balance the piston between columns of fluid or gases in its rotation, substantially as described.

12. In an apparatus as herein described, consisting of a piston or pistons with two cam-shaped surfaces, and heads or abutments with cam-shaped surfaces rotatably riding in contact with one another within a casing, pockets or chambers being formed upon either side of the piston of different volume adapted to admit and exhaust expansible fluid whose action suspends or balances the piston, substantially as described.

In testimony whereof I have hereunto set my hand in the presence of two subscribing witnesses.

FREDERICK W. JAEGER.

Witnesses:
 EUGENIE P. HENDRICKSON,
 GEO. W. EISENBRAUN.